Patented Dec. 17, 1940

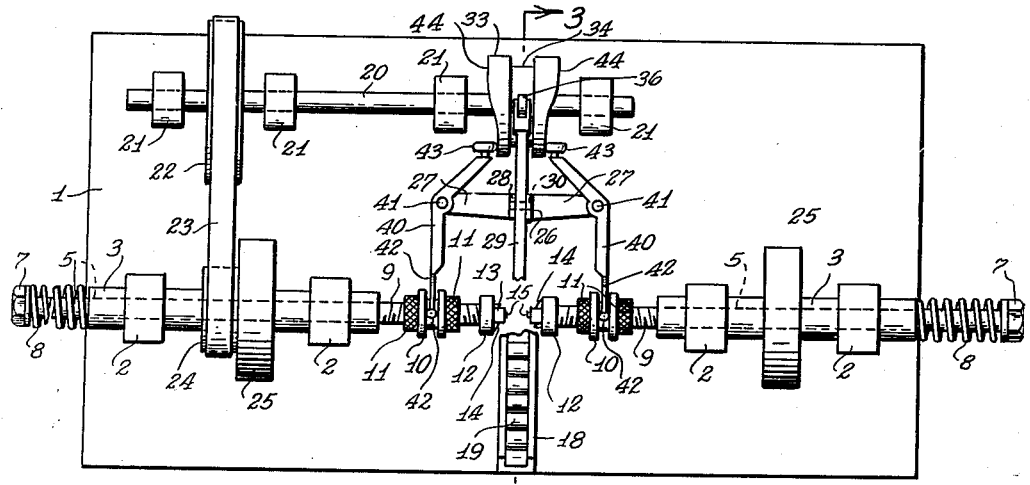

2,225,127

UNITED STATES PATENT OFFICE 2,225,127

DEBURRING MACHINE

Irving Oppenheim, Detroit, Mich.

Application April 8, 1939, Serial No. 266,724

8 Claims. (Cl. 77—3)

The present invention pertains to a novel deburring machine designed particularly for removing internal burrs at the ends of tubular members. In the manufacture of short tubular lengths to be used for bearings or other purposes, such lengths are cut from tubular stock. The cutting operation leaves burrs at the ends on the inner circumference of the short lengths. At present, these burrs are removed with a power tool manipulated by hand, first at one end of the tube and then at the other end.

The principal object of the invention is to provide a machine whereby the entire operation is performed automatically and mechanically. More particularly, the machine according to this invention automatically performs the operations of seating the work on a fixture, holding the work in the fixture, bringing a pair of tools to the ends of the work piece, withdrawing the tools and releasing the work piece from the fixture. In this connection, another object of the invention is to provide a machine which deburrs both ends of the work simultaneously.

In the accomplishment of these objects, the machine includes a pair of sliding and rotating tool spindles to be engaged with the work while the latter is held in a fixture. The fixture is in the form of a seat or rest to which the work pieces are successively rolled from a chute. A clamping member for holding the work on the fixture is actuated concurrently with the sliding of the tool spindles toward and away from the work.

These movements are accomplished by a cam structure on a shaft adjacent to the spindles. The cam system has two like parts for moving the spindles with respect to the work, and another cam surface for actuating the clamping member over the fixture. When a work piece seats on the fixture, the cam system moves the clamping member into locking position and brings the tool spindles towards the work piece so that the tools carried by the spindles may perform their function. When the spindles are withdrawn from the work by the cams, the clamping member is released from the work piece to permit the latter to roll off the fixture. The speed of the machine is such that the clamping member again comes to locking position when the next piece rolls onto the fixture.

The machine may readily be adjusted to chamfer the ends of the work in addition to deburring them. Various lengths of work can be accommodated by merely replacing the cam system or making adjustments in other parts of the machine.

The invention is fully disclosed by way of example in the following description and the accompanying drawing, in which:

Figure 1 is a plan view of the machine;

Figure 2 is a side elevation thereof, partly in section;

Figure 3 is a transverse section on the line 3—3 of Figure 1.

Reference to these views will now be made by use of like characters that are employed to designate corresponding parts throughout.

In Figures 1 and 2 the machine is illustrated as built on a base 1 which may be of any suitable construction. On the base are mounted a number of posts or uprights 2 in alignment, for a purpose that will presently be described. The posts are divided into two groups with an equal number in each, and in each such group is journaled a hollow shaft 3. Obviously, the shafts are also in alignment with each other. The shafts are adapted to rotate in their respective bearings 4 and are suitably held against sliding movement.

In each shaft is slidably mounted a spindle 5 held by a key 6 against turning. The outer end of each spindle carries a nut 7, and between the nut and the adjacent outer end of the shaft is a compressed coil spring 8. These springs tend to draw the shafts away from each other, for a purpose that will presently be described.

The inner end portion of each spindle has reverse threads 9 and on this portion is mounted a double-flanged collar 10. The collar is adjustable lengthwise on the spindle and is secured in the desired position by lock nuts 11, engaging the ends thereof and mounted respectively on the reverse threads.

On the inner extremity of each spindle is mounted a chuck 12 in any suitable manner. The chuck has a reduced forward or inner portion 13 through which is diametrically passed a cutting tool 14 adjustably secured by a set screw 15. The tools are adapted to engage opposite ends of a piece of work supported between them in a manner presently to be described.

Below the mid-point between the tools, another post 16 is mounted on the base and is formed at its upper end with a seat or fixture 17. An inclined chute 18 leads to the fixture and is designed to roll a number of tube lengths 19 successively to the fixture. These lengths are cut from a long piece of stock tubing and are to be used as bearings for wrist pins or similar members. The cutting operation leaves burrs on the inner circumference of each end of the short lengths. The machine herein described removes the burrs and also chamfers the ends, if desired, to facilitate insertion of the wrist pin or the like.

The machine is constructed to hold the lengths 19 successively on the fixture 17 and simultaneously insert the tools 14 into the ends thereof to remove the burrs and also chamfer the ends, if desired. With this purpose in view, there is provided a counter-shaft 20 parallel to the shafts 3 and journaled in suitable bearings 21 mounted on the base 1. The countershaft is driven in any suitable manner, for example, by a pulley 22 thereon connected by a belt 23 to a pulley 24 fixed on the opposite shaft 3. Both shafts 3, in turn, are driven in any suitable manner as by means of pulleys 25 thereon belted to an overhead power shaft. The drive gear disclosed is merely illustrative, and any other suitable drive may be employed, such as gearing or independent motors. The speed ratio between the shafts 3 and 20 is also illustrative and may be varied according to the requirements of the work in any well-known manner.

Between the shaft 20 and the shafts 3 is provided another post or standard 26 formed at its upper end with a cross head 27. The post 26 is extended upwardly at 28, and on the extension is pivotally mounted a lever 29 on a horizontal axis 30. The lever extends to a point above the fixture 17, as shown in Figure 3, and there carries a vertical stem 31. On the lower end of the stem is secured a head 32 adapted to hold a work piece 19 on the fixture.

The shaft 20 carries a cam member 33 formed with a peripheral groove or cam surface 34. The latter is circular and concentric with the shaft 20 except at a flat 35. The lever 29 extends to a point above this cam surface and there carries a roller 36 riding on the cam. A spring 37 joins this side of the lever 29 to the extension 28 and maintains the roller in contact with the cam 34, 35. Thus, the circular part of the cam maintains the head 32 at the opposite end in clamping position on the work, and the flat 35 permits the work to be released. The stem 31 has a spring backing 38 against a yoke 39 on the lever 29 to cushion the head 32 when it is brought down on the next work piece 19.

On the ends of the cross head 27 are mounted arms or levers 40 on vertical axes 41. These levers at one end carry forks or yokes 42 engaging respectively the collars 10. The opposite ends of these levers carry rollers 43 engaging the ends of the cam block which are formed as cam faces 44. The springs 8, pulling outwardly on the spindles 5 and collars 10 hold the rollers 43 against the cam faces 44. The cam faces vary in depth around the axis of the shaft 20, as shown in Figure 1. They are arranged symmetrically, or in like relation to their respective rollers 34, so that they spread the rollers and bring the tools 14 towards each other on rotation of the shaft 20.

In the operation of the device, the chute 18 is loaded with work pieces 19 which are allowed to roll to the fixture 19 and are successively clamped thereon by the head 32 in the manner already described. While so held during the travel of the arcuate cam surface 34 against the roller 36, the work piece is subjected to the action of the tools 14. In other words, the rollers 43 are engaged by the wider parts of cam faces 44 in this interval, whereby the spindles 5 are drawn together and the tools 14 inserted in the ends of the work piece. The relation of the flat 35 to the cam faces 44 is obviously such as to produce this conjoint action of the lever 29 and levers 40. The timing of the countershaft 20 relatively to spindle shafts 3 is therefore immaterial, but the speed ratio should be adjusted to give the tools the desired number of turns while the work is held on the fixture 17. Also, the distance between the tools in their final cutting position should be adjusted according to the length of the work piece and the amount of cutting to be done thereon. This adjustment is made at the collars 10 in the manner described above, the collars actually retaining a constant relation to the cams while the spindles are advanced or retracted relatively to the work. Beyond the limits of such adjustment, a cam of different size can be mounted on the countershaft 20 and the collars 10 shifted accordingly.

The peripheral extent of the flat 35, which determines the movement of the head 32 is comparatively short and is so timed with relation to the movement of the work pieces in the chute 18 as to clamp the piece immediately following that released from the fixture 17 on lifting of the head.

The seat 45 of the fixture 17 is convex in order to aid in holding the work piece 19 and slopes downwardly away from the lower end of the chute 18 to permit the work piece ro roll off the fixture when released by the head 32. The lower face 46 of the head 32 is also convex to aid in clamping the work piece and contributes further to this purpose in that it also slopes downwardly away from the chute, as may be seen in Figure 3.

The fixtures 17 and 32 are interchangeable for various diameters of work.

Although a specific embodiment of the invention has been illustrated and described, it will be understood that various alterations in the details of construction may be made without departing from the scope of the invention as indicated by the appended claims.

What I claim is:

1. In a machine of the character described, a work-supporting fixture, a tool spindle slidably mounted adjacent thereto, a rotary shaft, a cam block on said shaft and having a peripheral cam surface, a lever having one end riding on said surface, means at the other end of said lever for holding a work piece on said fixture, a lateral cam face on said block, and another lever having one end engaging the last named face and its other end yoked on said spindle to slide the latter relatively to said fixture.

2. In a machine of the character described, a work-supporting fixture, a tool spindle slidably mounted adjacent thereto, a rotary shaft, a cam on said shaft, a lever having one end riding on said cam, a head at the other end of said lever for holding a work piece on said fixture, a spring connection between said head and said other end, another cam on said shaft, and another lever having one end engaging the last named cam and its other end yoked on said spindle to slide the latter relatively to said fixture.

3. In a machine of the character described, a work-supporting fixture, a tool spindle slidably mounted adjacent thereto, a rotary shaft, a cam on said shaft, a lever having one end riding on said cam, a head at the other end of said lever for holding a work piece on said fixture, a spring connection between said head and said other end, another cam on said shaft, and another lever having one end engaging the last named cam and its other end yoked on said spindle to slide the latter relatively to said fixture, and a feed chute leading to said fixture, said fixture and said head having concave seats adapted to engage and clamp the work.

4. In a machine of the character described, a work-supporting fixture, a tool spindle slidably mounted adjacent thereto, a rotary shaft, a cam on said shaft, a lever having one end riding on said cam, means at the other end of said lever for holding a work piece on said fixture, another cam on said shaft, and another lever having one end engaging the last named cam and its other end having a yoke connection to said spindle, and means for adjusting the position of said connection lengthwise of said spindle.

5. In a machine of the character described, a work-supporting fixture, a pair of tool spindles slidably mounted at opposite sides thereof, a rotary shaft, a cam on said shaft, a lever having one end engaging said cam, means at the other end of said lever for engaging a work piece on said fixture, a pair of oppositely acting cams on said shaft, a pair of levers each having one end in engagement with one of the last named cams and the remaining ends having yoked connections to said spindles respectively, and means for adjusting the position of said connections lengthwise of said spindles.

6. In a machine of the character described, a work-supporting fixture, a pair of tool spindles slidably mounted at opposite sides thereof, a rotary shaft, a cam block on said shaft and having a peripheral cam surface, a lever having one end engaging said surface, means at the other end of said lever for engaging a work piece on said fixture, a pair of oppositely acting lateral cam faces on said block, a pair of levers each having one end in engagement with one of the last named faces and the remaining ends having yoked connections to said spindles respectively, and means for adjusting the position of said connections lengthwise of said spindles.

7. In a machine of the character described, a work-supporting fixture, a pair of tool spindles slidably mounted at opposite sides thereof, a rotary shaft, a cam block on said shaft and having a peripheral cam surface, a lever having one end engaging said surface, means at the other end of said lever for engaging a work piece on said fixture, a pair of oppositely acting lateral cam faces on said block and extending radially beyond said cam surface to form therewith a cam groove, a pair of levers each having one end in engagement with one of the last named faces and the other end yoked on one of said spindles to slide the latter relatively to said fixture.

8. In a machine of the character described, a work-supporting fixture, a pair of tool spindles slidably mounted at opposite sides thereof, a rotary shaft, a cam block and having a peripheral cam surface on said shaft, a standard adjacent to said spindles and shaft, a lever pivoted to said standard and having one end engaging said surface, means at the other end of said lever for engaging the work piece on said fixture, a pair of oppositely acting cam faces on said block and extending radially beyond said cam surface to form therewith a cam groove, a pair of levers pivoted to said standard, each of the last named levers having one end in engagement with one of the last named faces and the other end yoked respectively on one of said spindles to slide the latter relatively to said fixture.

IRVING OPPENHEIM.